United States Patent
Curtis et al.

(10) Patent No.: US 8,157,882 B2
(45) Date of Patent: Apr. 17, 2012

(54) HANGING AIR FILTER

(75) Inventors: Brent Aaron Curtis, Anderson, SC (US); Andrew Neil Robinson, Williamston, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 547 days.

(21) Appl. No.: 12/395,232

(22) Filed: Feb. 27, 2009

(65) Prior Publication Data

US 2010/0218468 A1  Sep. 2, 2010

(51) Int. Cl.
B01D 39/00 (2006.01)

(52) U.S. Cl. ............ 55/505; 55/357; 55/385.1; 55/497; 55/511; 55/501; 55/478; 55/481; 55/522; 55/DIG. 31; 55/DIG. 35; 96/151; 96/118; 96/117.5; 422/122; 422/5; 261/DIG. 88

(58) Field of Classification Search .............. 55/503, 55/507, 505, 357, 385.1, 385.4, 497, 511, 55/501, 478, 481, 522, 528, DIG. 31, DIG. 35; 96/151, 118, 117.5; 422/122, 5; 261/DIG. 88
See application file for complete search history.

(56) References Cited

U.S. PATENT DOCUMENTS

| 2,085,991 | A | 7/1937 | Minor |
|---|---|---|---|
| 2,206,705 | A | 7/1940 | Newman |
| 2,765,046 | A | 10/1956 | Rondholz |
| 3,739,558 | A | 6/1973 | Hurson |
| 5,062,272 | A | 11/1991 | Burns |
| 5,468,447 | A | 11/1995 | Bermas |
| 5,492,675 | A | 2/1996 | Brizard |
| 5,525,136 | A | 6/1996 | Rosen |
| 5,772,959 | A | 6/1998 | Bermas |
| 6,286,330 | B1 | 9/2001 | Kopf |
| 6,346,143 | B1 | 2/2002 | McGowan |
| 2005/0022549 | A1 | 2/2005 | Anderson et al. |

FOREIGN PATENT DOCUMENTS

JP  5317641  12/1993

OTHER PUBLICATIONS

International Search Report for PCT/US2010/025023 dated Nov. 9, 2010, 3 pages.

*Primary Examiner* — Jason M Greene
*Assistant Examiner* — Dung H Bui
(74) *Attorney, Agent, or Firm* — Pearne & Gordon LLP

(57) ABSTRACT

An air filter for filtering air in a refrigerating apparatus is provided, including a housing having a hollow body with at least a front wall, a pair of side walls, and a top and bottom wall. At least one wall includes at least one aperture for the passage of air. The air filter further includes at least one cantilever attaching means for removably securing the housing to the refrigerating apparatus, and a filter element for removable placement within the housing. Air enters the at least one aperture, makes contact with the filter element, and leaves the air filter.

30 Claims, 3 Drawing Sheets

HANGING AIR FILTER

FIELD OF THE INVENTION

The present invention relates generally to air filters, and more particularly, to removable air filters capable of being mounted within refrigerators.

BACKGROUND OF THE INVENTION

Air filters are capable of being mounted in a number of places including refrigerators. When an air filter is mounted within a refrigerator, the air filter should be placed in an unused yet accessible space. Since the contents of a refrigerator, including food, drink, shelving, etc., are frequently changing, an unused yet accessible mounting space is not static. Thus, there is a continuing need for an air filter that is movable to different positions in the refrigerator compartment. Furthermore, the filter should be replaced periodically to ensure effective and efficient air filtering. It is costly and time consuming to have a manufacturer service the air filter every time it needs to be replaced. Thus, there is also a continuing need for an air filter that allows a user to both move and replace the filter within the refrigerator.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, an air filter for filtering air in a refrigerator is provided, comprising a housing having a hollow body including at least a front wall, a pair of side walls, and a top and bottom wall, wherein at least one wall includes at least one aperture for the passage of air, at least one cantilever attaching means for removably securing the housing to the refrigerating apparatus, and a filter element for removable placement within the housing wherein air enters the at least one aperture, makes contact with the filter element, and leaves the air filter.

In accordance with another aspect of the present invention, an air filter for filtering air in a refrigerator, comprising a housing having a hollow body including a front and back wall, a pair of side walls, and a bottom wall, wherein at least one wall includes at least one aperture for the passage of air, at least one cantilever attaching means for removably securing the housing to the refrigerating apparatus, and a filter element for removable placement within the housing wherein air enters the at least one aperture, makes contact with the filter element, and leaves the air filter.

In accordance with another aspect of the present invention, an air filter for filtering air in a refrigerator, comprising a housing having a hollow body including a front and back wall, a side wall, and a top and bottom wall, wherein at least one wall includes at least one aperture for the passage of air, at least one cantilever attaching means for removably securing the housing to the refrigerating apparatus, and a filter element for removable placement within the housing wherein air enters the at least one aperture, makes contact with the filter element, and leaves the air filter.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
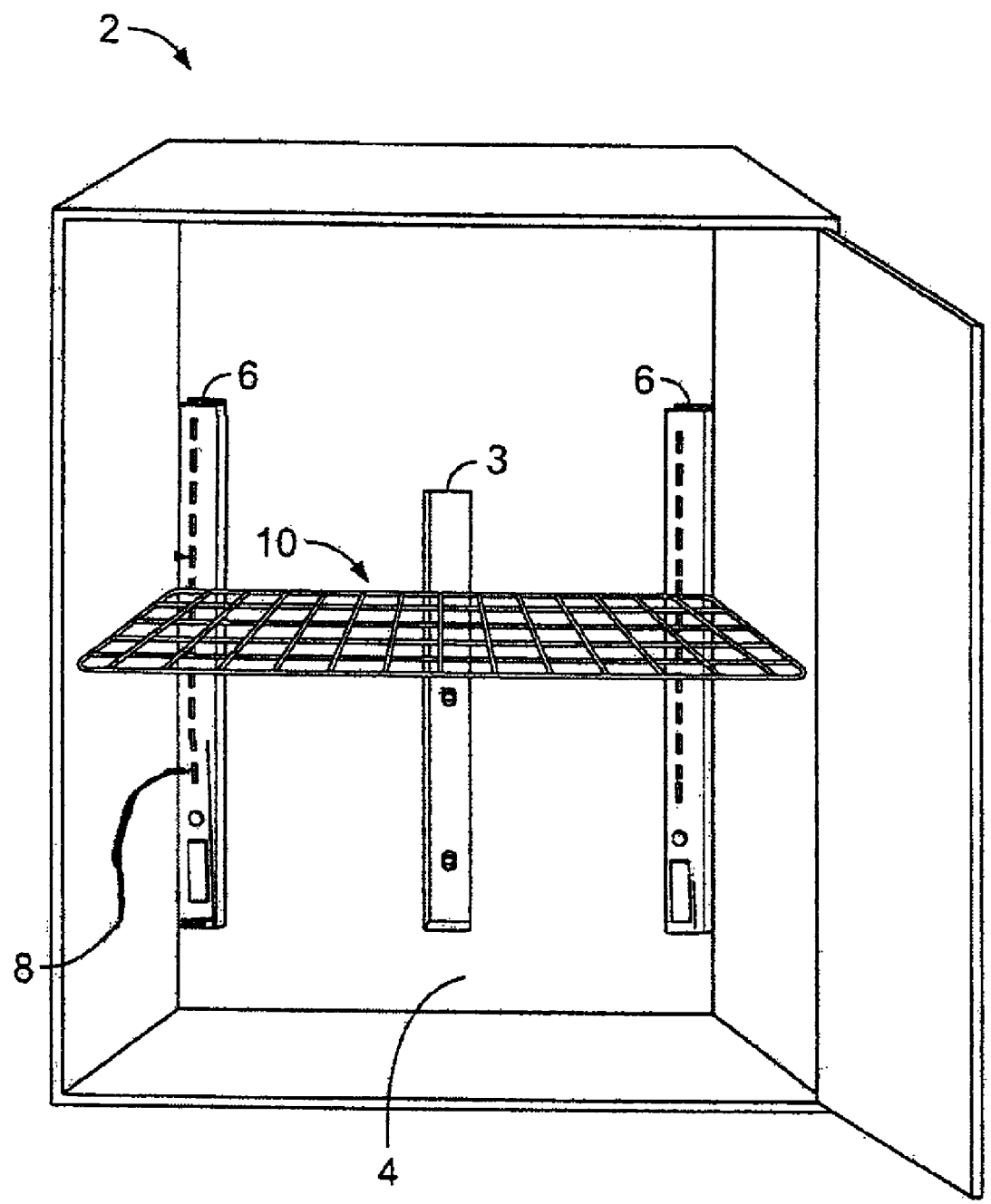
FIG. 1 is a front view of a refrigerator and the interior compartment.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to the shown example of FIG. 1, an interior 4 of a refrigerator 2 is shown. The interior 4 may be organized in a number of different ways, including different shelf configurations along with different drawer configurations. The refrigerator 2 may also be provided with one or more rails 6 arranged vertically within the refrigerator 2. The rails 6 may be housed in recesses 3 arranged vertically throughout the refrigerator interior. The rails 6 may include a plurality of vertically-spaced orifices 8 to support refrigerator components. For instance, a refrigerator shelf 10 or drawer may be provided with hooks that hook into the orifices, giving support for the shelf. To move the shelf 10 up or down, a user may unhook the shelf 10 and replace it in a different vertical position by inserting the hooks in a different set of orifices 8. The rails 6 may be secured at a number of locations within the refrigerator 2, including at opposite sides of the refrigerator interior 4, in a center recess 3 of the refrigerator, etc. The present invention is not limited to the use of rails 6 for securing refrigerator components. For instance, the refrigerator interior 4 may be equipped with orifices 8 in the refrigerator walls to accommodate components, or there may be horizontal slots that hold rails with orifices.

Figure 2:
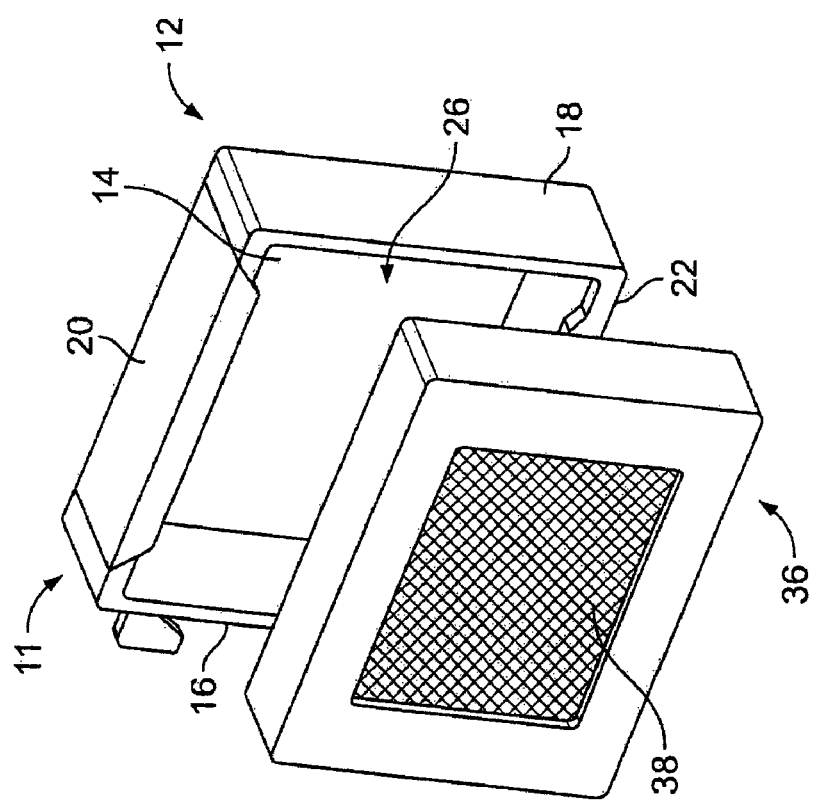
FIG. 2 is a rear view of an air filter system including a filter housing and a filter element.

Referring to FIG. 2, an embodiment of a filter housing 12 is shown. In this embodiment, the filter housing 12 is hollow and rectangularly shaped. The filter housing 12 may be defined by a front wall 14, inner and outer side walls 16, 18, and a top and bottom wall 20, 22. The walls of the filter housing 12 define a hollow interior. The walls may be formed together as a single piece or may be fixed together, such as by welding, gluing, etc. Each side of the front wall 14 is fixed to a side of the top 20, bottom 22, and side walls 16, 18. There is no back wall 24 in this embodiment, but instead, there is an opening 26 in the filter housing 12. A filter element 36 may be inserted into the filter housing 12 through the opening 26. The filter housing 12 may comprise a variety of configurations as well. For instance, the filter housing may be circular, having front, back, and circular walls, square, etc. In addition, the filter housing 12 may be made of a variety of materials, including plastic, metal, etc.

Figure 3:
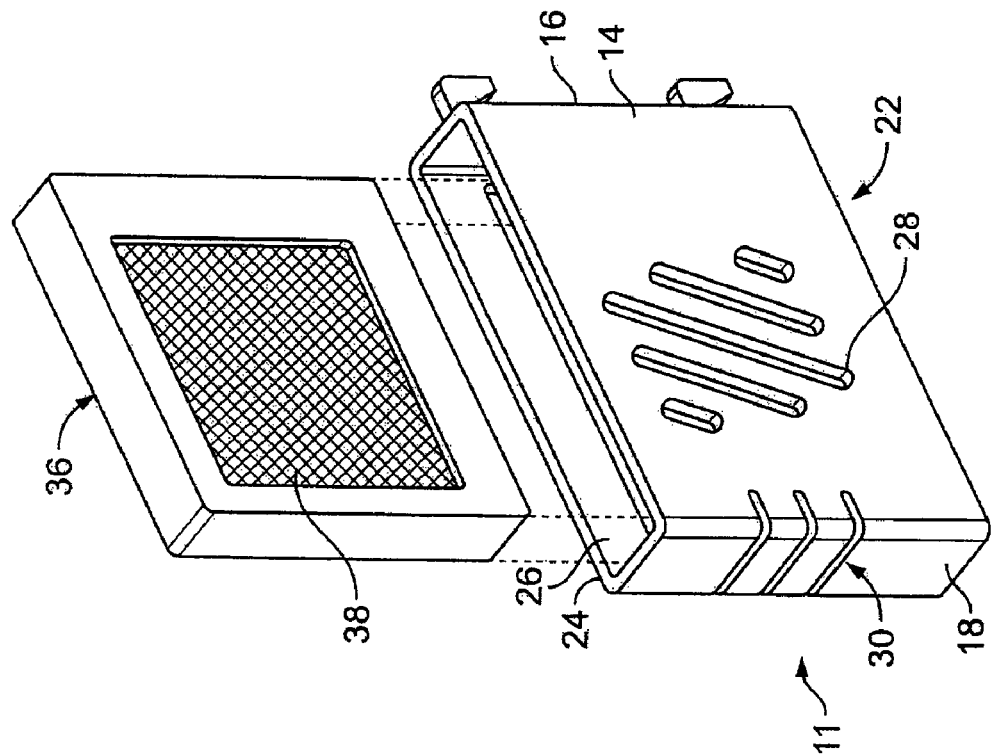
FIG. 3 is a front perspective view of a second embodiment of an air filter system including a filter housing and a filter element.

The filter housing 12 may also be provided with an aperture 28 or a plurality of apertures 28 in a wall. In FIG. 3, the filter housing 12 is provided with a plurality of diagonal apertures 28 in the front wall 14. However, different aperture arrangements are contemplated, such as a single large aperture in the front wall, circular apertures in the front wall, one or more horizontal or vertical apertures in the front wall, one or more apertures in the top 20, bottom 22, or side walls 16, 18, etc. The housing 12 may also include two separate sets of apertures 28, such as one set of apertures 28 on one wall and a different set of apertures on a second wall, or one set of apertures 28 on a wall and a separate set of apertures on the same wall. The housing may also include grips 30, allowing for easier handling by the user. As shown in FIG. 3, the grips 30 are secured to the outer side wall 18. The grips 30 may be secured in a number of places, however. For instance, the grips 30 can be secured to the top and bottom walls 20, 22, to the front wall 14, etc. The grips may be formed of any material that provides easier handling by the user, including, but not limited to, rubber. Furthermore, the grips may constitute indentations or grooves in a wall.

Figure 4:
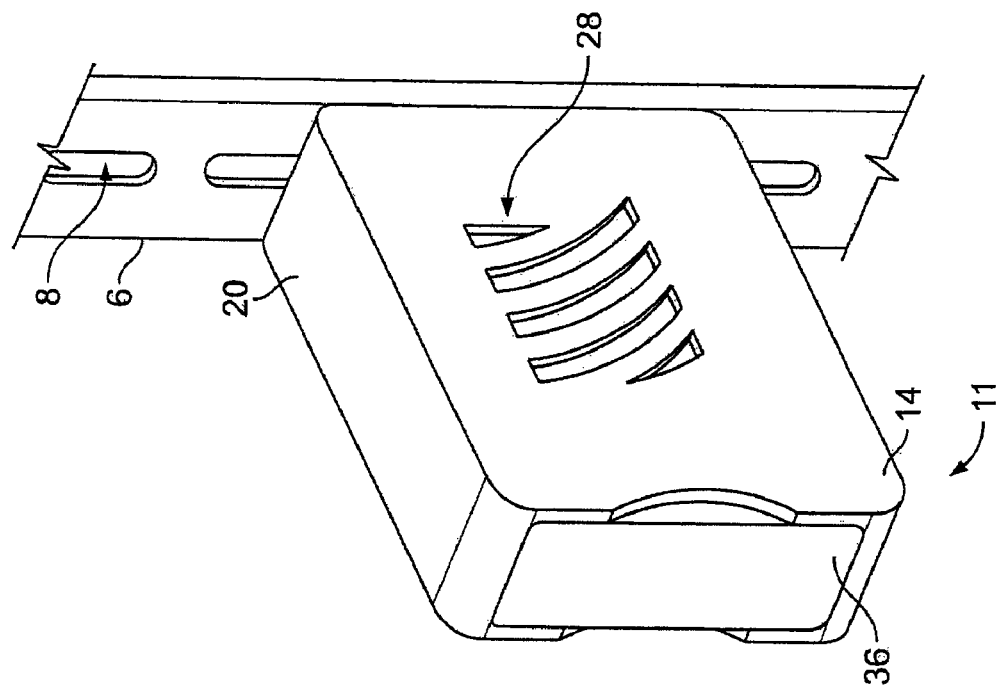
FIG. 4 is a perspective view of a third embodiment of an air filter system including a filter housing and a filter element.

FIGS. 3 and 4 show alternate embodiments of the filter housing 12. The filter housings 12 shown in FIGS. 3 and 4 are also hollow and rectangularly shaped. The filter housing 12 shown in FIG. 3 may be defined by front and back walls 14, 24, inner and outer side walls 16, 18, and a bottom wall 22. There is no top wall 20 in this embodiment, but instead, there is an opening 26 in the filter housing 12 in place of the top wall 20. The filter element 36 may be inserted into the filter housing 12 through the opening 26. The filter housing 12 shown in FIG. 4 may be defined by front and back walls 14, 24, an inner side wall 16, and top and bottom walls 20, 22. There is no outer side wall 18 in this embodiment, but instead, there is an opening 26 in the filter housing 12 in place of the outer side wall 18. The filter element 36 may be inserted into the filter housing 12 through the opening 26. As with previous embodiments, the walls in these embodiments may be formed as a single piece or fixed together, such as by welding, gluing, etc.

Figure 5:
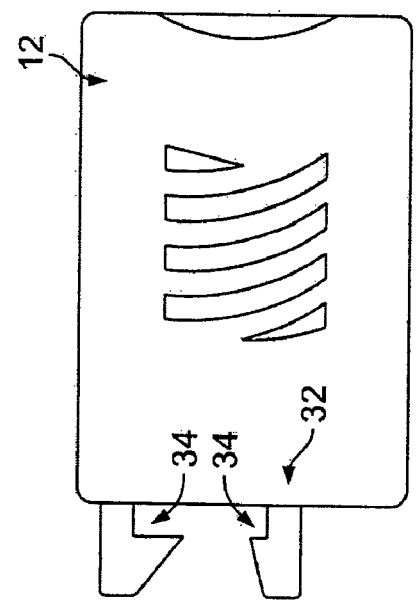
FIG. 5 is a front view of an attaching means for the air filter system.

Referring now to FIG. 5, there is shown a cantilever attaching means 32 for securing the filter housing 12 to the rail 6. The cantilever attaching means 32 may comprise a pair of spaced hooks 34 secured to the inner side wall 16 of the filter housing 12. The hooks 34 may be formed either as a single piece with the filter housing 12 or may be fixed to the filter housing 12, such as by welding, gluing, etc. The hooks 34 may be supported at one end by being attached to the filter housing. The other end of the hooks 34 are small enough to be inserted into the orifices 8 of the rail 6 but large enough to form a tight fit and limit movement. The hooks 34 may comprise a number of different embodiments, since an objective of the hooks 34 is to secure the filter housing 12 to the rail. In the embodiment shown in FIG. 5, the hooks 34 may be spaced apart and opposing each other. In another embodiment, the hooks 34 may be facing the same direction and turned downwards. In yet another embodiment, one hook 34 may be facing downwards while the other hook 34 is oriented in a horizontal direction and capable of being flexed, allowing for a more secure fitting within the orifice 8. In any of the listed embodiments, the hooks 34 allow the filter housing 12 to be secured on any of the rails 6 within the refrigerator 2. Furthermore, it is contemplated that the filter housing 12 may be inverted with the hooks 34 still capable of insertion into the orifices 8 of the rail. Therefore, the hooks 34 allow a user to move the filter housing 12 to a different location within the refrigerator 2 and also invert the filter housing 12 if necessary.

The filter element 36 is provided for insertion into the filter housing 12. The filter element 36 may be inserted through the opening 26 into the hollow center of the filter housing 12. As shown in FIGS. 2, 3, and 4, the opening 26 may be in different locations depending on the embodiment, as the opening may replace the back wall 24, top wall 20, or outer side wall 18. Referring to FIG. 3, to insert the filter element 36, the user may simply slide the filter element 36 through the opening 26 into the filter housing 12. In one embodiment, the filter housing 12 or filter element 36 may be provided with a snap-fit means, allowing for a more secure fit between the filter housing 12 and filter element 36. In another embodiment, the interior of the filter housing 12 and the filter element 36 may be provided with magnets to ensure a connection when the filter element 36 has been inserted into the filter housing 12. The filter element 36 is provided with a porous surface 38. The porous surface 38 may be a screen that is secured to the filter element 36 or the porous surface 38 may be formed as one piece with the filter element 36. Filtering of the air occurs as the air flow rubs against the porous surface 38 and is redirected by it. Therefore, air does not pass through porous surface 38, but instead rubs against the surface 38. In one embodiment, the filter element 36 may be a carbon filter. However, other filter elements are also contemplated. The porous surface 38 may act to remove particulates, such as dust, bacteria, mold, food particles, etc. from the air of the refrigerator interior. This may improve the smell, cleanliness, appearance, etc. of the refrigerator interior. Thus, uncleaned air may enter the filter housing 12 through apertures 28, make contact with the porous surface 12 causing the uncleaned air to be filtered, and then exit the filter housing 12 through apertures 28.

One possible operation of an embodiment of the air filter 11 will now be described. First, a user may secure the filter housing 12 to a rail 6 within the refrigerator 2. The user may slide the hooks 34 into corresponding orifices 8 on the rail 6 to ensure a snug fit. With the filter housing 12 secure, the user may then insert the filter element 36 into the filter housing 12. As mentioned, this may be accomplished in a number of ways, including sliding the filter element 36 into the filter housing 12, snap-fitting the filter element 36 within the housing 12, sliding the filter element 36 within the housing 12 and ensuring that the magnets make contact, etc., depending on the embodiment. Next, air may enter the filter housing 12 by passing through the apertures 28 provided on one of the walls. As air enters, it makes contact with the porous surface 38 of the filter element 36. In one embodiment, air may make contact with the porous surface 38 and flow against it. The porous surface 38 may then redirect the air flow to exit through the apertures 28. By making contact with the porous surface 38, particulates from the air are removed and may adhere to the porous surface 38, providing cleaner air. After making contact with and rubbing against the porous surface 38, cleaner air may then exit the filter housing 12. Thus, the apertures 28 in the filter housing 12 may serve as both the entrance and exit for the air flow. In an alternate embodiment, the filter housing 12 may be equipped with a plurality of apertures 28 allowing for separate entrance and exit apertures for the air flow. In this instance, air may enter one aperture, or multiple apertures, make contact with the porous surface of the filter element, and then exit a separate aperture, or apertures, after being redirected by the filter element. The user may also move the filter housing 12 or replace the filter element 36 as mentioned. To move the filter housing 12, the user may unhook the housing 12 from the corresponding rail 6 and reinsert the filter housing hooks 34 into the orifices 8 at the desired location. Furthermore, replaceable filter elements and filter housings may be available for purchase as aftermarket accessories. To replace the filter element 36, the user may slide or unsnap the filter element, depending on the chosen embodiment, and replace the used filter element with a new filter element.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. An air filter for filtering air in a refrigerating apparatus, comprising:
    a housing having a hollow body including a front wall, a pair of side walls, a top wall, and a bottom wall, wherein at least one wall includes at least one aperture for the passage of air;
    a cantilever attaching means for removably securing the housing to the refrigerating apparatus, the cantilever attaching means includes a pair of hooks opposing each other; and
    a filter element for removable placement within the housing,
    wherein air enters the at least one aperture, makes contact with the filter element, and leaves the air filter.

2. The air filter according to claim 1, wherein the at least one aperture is positioned on the front wall opposite the filter element.

3. The air filter according to claim 1, wherein the cantilever attaching means is formed integral to one of the side walls of the housing.

4. The air filter according to claim 1, wherein the pair of hooks project outwardly from the housing allowing for attachment onto the refrigerating apparatus.

5. The air filter according to claim 4, wherein the pair of hooks allow the housing to be inverted and attached onto the refrigerating apparatus.

6. The air filter according to claim 1, wherein the filter element is porous and allows air to rub against the filter element but not pass through the filter element.

7. The air filter according to claim 5, wherein the filter element is a carbon filter.

8. An air filter for filtering air in a refrigerating apparatus, comprising:
    a housing having a hollow body including a front wall, a pair of side walls, a top wall, a bottom wall, and an opening opposite of the front wall, wherein at least one wall includes at least one aperture for the passage of air;
    a cantilever attaching means for removably securing the housing to the refrigerating apparatus; and
    a filter element for removable placement within the housing, the filter element is adapted to be inserted into the housing through the opening,
    wherein air enters the at least one aperture, makes contact with the filter element, and leaves the air filter.

9. An air filter for filtering air in a refrigerating apparatus, comprising:
    a housing having a hollow body including a front wall, a back wall, a pair of side walls, and a bottom wall, wherein at least one wall includes at least one aperture for the passage of air;
    a cantilever attaching means for removably securing the housing to the refrigerating apparatus, the cantilever attaching means includes a pair of hooks opposing each other; and
    a filter element for removable placement within the housing,
    wherein air enters the at least one aperture, makes contact with the filter element, and leaves the air filter.

10. The air filter according to claim 9, wherein the at least one aperture is positioned on the front wall opposite the filter element.

11. The air filter according to claim 9, wherein the cantilever attaching means is formed integral to one of the side walls of the housing.

12. The air filter according to claim 9, wherein the pair of hooks project outwardly from the housing allowing for attachment onto the refrigerating apparatus.

13. The air filter according to claim 12, wherein the pair of hooks allow the housing to be inverted and attached onto the refrigerating apparatus.

14. The air filter according to claim 9, wherein the filter element is porous and allows air to rub against the filter element but not pass through the filter element.

15. The air filter according to claim 14, wherein the filter element is a carbon filter.

16. An air filter in a refrigerating apparatus, comprising:
    a housing having a hollow body including a front wall, a back wall, a pair of side walls, a bottom wall, and an opening opposite of the bottom wall, wherein at least one wall includes at least one aperture for the passage of air;
    a cantilever attaching means for removably securing the housing to the refrigerating apparatus; and
    a filter element for removable placement within the housing, the filter element is adapted to be inserted into the housing through the opening,
    wherein air enters the at least one aperture, makes contact with the filter element, and leaves the air filter.

17. An air filter for filtering air in a refrigerating apparatus, comprising:
    a housing having a hollow body including a front wall, a back wall, a side wall, a top wall, and a bottom wall, wherein at least one wall includes at least one aperture for the passage of air;
    a cantilever attaching means for removably securing the housing to the refrigerating apparatus, the cantilever attaching means includes a pair of hooks opposing each other; and
    a filter element for removable placement within the housing,
    wherein air enters the at least one aperture, makes contact with the filter element, and leaves the air filter.

18. The air filter according to claim 17, wherein the at least one aperture is positioned on the front wall opposite the filter element.

19. The air filter according to claim 17, wherein the cantilever attaching means is formed integral to the side wall of the housing.

20. The air filter according to claim 17, wherein the pair of hooks project outwardly from the housing allowing for attachment onto the refrigerating apparatus.

21. The air filter according to claim 20, wherein the pair of allow the housing to be inverted and attached onto the refrigerating apparatus.

22. The air filter according to claim 17, wherein the filter element is porous and allows air to rub against the filter element but not pass through the filter element.

23. The air filter according to claim 22, wherein the filter element is a carbon filter.

24. An air filter for filtering air in a refrigerating apparatus, comprising:
- a housing having a hollow body including a front wall, a back wall, a side wall, a top wall, a bottom wall, and an opening opposite the side wall, wherein at least one wall includes at least one aperture for the passage of air;
- a cantilever attaching means for removably securing the housing to the refrigerating apparatus, the cantilever attaching means includes a pair of hooks opposing each other; and
- a filter element for removable placement within the housing, wherein the filter element is inserted into the housing through the opening,
- wherein air enters the at least one aperture, makes contact with the filter element, and leaves the air filter.

25. The air filter according to claim 1, wherein the cantilever attaching means removably secure the housing to a rail for supporting a shelf in the refrigerating apparatus.

26. An air filter for filtering air in a refrigerating apparatus, comprising:
- a housing having a hollow body including an opening and at least one aperture for the passage of air;
- a cantilever attaching means for removably securing the housing to the refrigerating apparatus;
- a filter element for removable placement within the housing, the filter element is inserted into the housing through the opening; and
- a retaining device for securing the filter element in the housing, the retaining device is provided on at least one of the housing or the filter element,
- wherein the filter element is retained in the housing without covering or blocking the opening.

27. The air filter according to claim 26, wherein the retaining device includes snap fit means.

28. The air filter according to claim 26, wherein the retaining device includes a magnet.

29. An air filter for filtering air in a refrigerating apparatus, comprising:
- a housing having a hollow body including an opening and at least one aperture for the passage of air;
- a cantilever attaching means including a first member and a second member for removably securing the housing to an orifice in the refrigerating apparatus, the first member is above the second member when the housing is secured to the refrigerating apparatus; and
- a filter element for removable placement within the housing, the filter element is inserted into the housing through the opening.

30. The air filter according to claim 29, wherein at least one of the first member and the second member is a hook.

* * * * *